Jan. 20, 1942. C. G. HALL 2,270,587
HEADLIGHT INDICATOR
Filed Sept. 14, 1938

CECIL GAYLORD HALL, INVENTOR
BY Harness Dind, Pates & Harris
ATTORNEYS.

Patented Jan. 20, 1942

2,270,587

UNITED STATES PATENT OFFICE 2,270,587

HEADLIGHT INDICATOR

Cecil Gaylord Hall, Jackson, Mich.

Application September 14, 1938, Serial No. 229,921

1 Claim. (Cl. 177—311)

This invention relates to an improved vehicle head light indicator and arrangement thereof on a vehicle.

More particularly, the invention pertains to a device of this kind for indicating whether the bright or dim filaments of a vehicle head light system are in operation.

One of the main objects of the invention is to provide a device of this character which is disposed in the normal forward view of the driver of the vehicle.

Another object of the invention is the provision of an indicator of this character which can be conveniently observed by the driver of the vehicle without requiring him to divert his attention from the road or the course in which he is about to proceed.

A further object of the invention is the provision in a radiator shell ornament of the type which are conventionally used on vehicles of a compartment for accommodating an electric light bulb and which has an opening at the rear extremity of the ornament directed toward the windshield and driver compartment of the vehicle.

Additional objects of the invention are the provision of head light condition indicating means in a radiator shell ornament which in no way distracts from the attractiveness or sightliness of the ornament; to provide an ornament of this kind which has a light outlet and a transparent window of lens shape construction which may be relied upon to predetermine the color of the light projected therefrom and which generally conforms in contour to the contour of the portion of the ornament on which it is disposed; to provide an indicating light bulb and ornament assembly in which the light bulb and its socket may be supported on that portion of the vehicle with which the ornament normally registers; and to provide in an ornament of this character communicating vertically and horizontally extending passage sections, one for accommodating insertion of an indicating light bulb into the body portion of the ornament and the other for accommodating projection of light rays rearwardly and in a direction of the windshield and driver of the vehicle.

An illustrative embodiment of the invention is shown in the accompanying drawing, in which.

Figure 1:
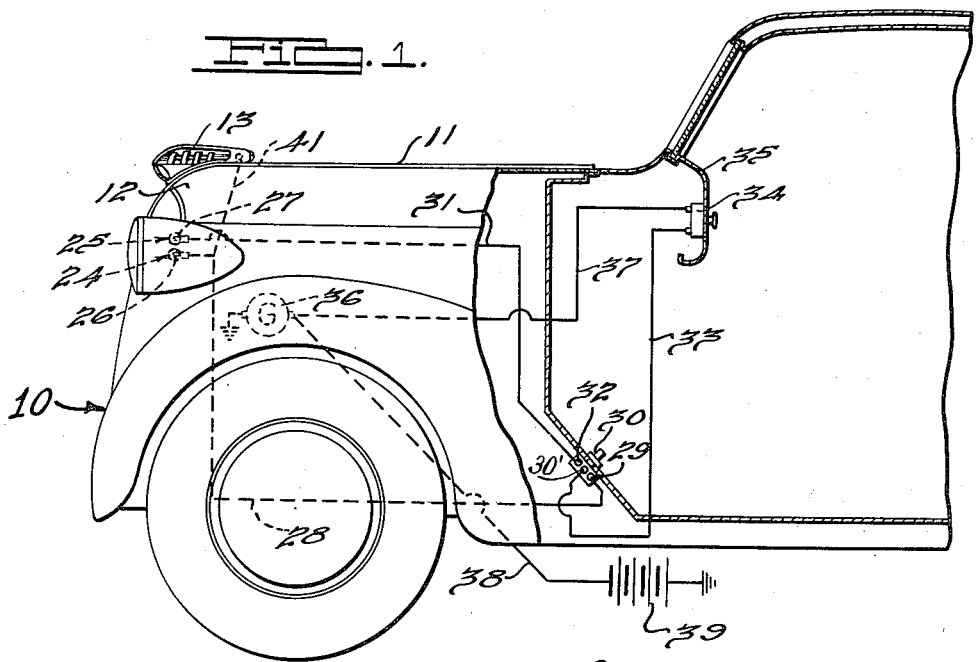
Fig. 1 is a fragmentary, side elevational view, partly in vertical section, of a vehicle equipped with a head light condition indicating system embodying the invention.
Figure 2:
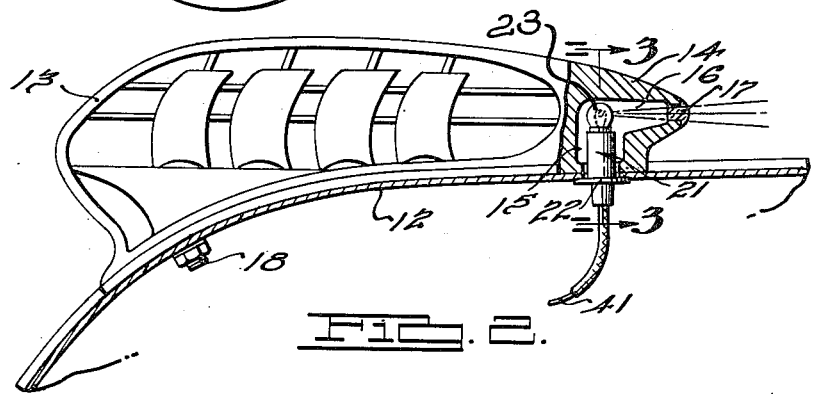
Fig. 2 is a fragmentary, sectional view of a vehicle radiator shell structure having an ornament thereon, shown partly in section, and with which is associated an indicating light bulb of an indicating system embodying the invention.
Figure 3:
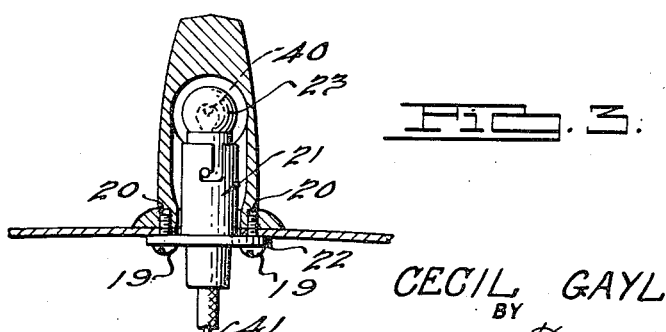
Fig. 3 is a fragmentary, transverse, vertical sectional view taken on the line 3—3 of Fig. 2.

In the drawing is illustrated an embodiment of my invention in a vehicle generally designated by the numeral 10 which includes forwardly protruding hood portions 11 having a radiator shell portion 12 on which is mounted a radiator shell ornament 13. The ornament 13 may comprise any desired configuration and preferably has a rearwardly extending body portion 14 of substantial cross sectional dimensions in which is formed a vertically extending passage section 15 and a communicating rearwardly extending horizontal passage section 16. The vertical passage section 15 extends through the bottom surface of the portion 14 of the ornament and the horizontal passage section 16 extends through the rear extremity of the body portion 14 and is directed toward the windshield and driver of the vehicle. A transparent plug 17 is fitted in the rear end of the horizontal passage section 16 and is preferably provided with an external contour which conforms to the general curvature or contour of the rear extremity of the ornament. This transparent plug may comprise material of any desired color in order to render it clearly conspicuous to the driver of the vehicle.

The front end of the ornament 13 may be detachably secured to the radiator shell structure 12 by a bolt 18 extending through an aperture formed in the latter and threaded in a registering aperture provided in the front end of the ornament. The rear end portion of the ornament is preferably secured to the radiator shell structure 12 by a pair of screws 19 which extend through apertures formed in the shell structure 12 and are threaded in apertures 20 formed in the rear end portion of the ornament. The screws 19 also serve to secure to the ornament and shell structure an electric light bulb socket 21 having a flange 22 disposed adjacent the internal side of the shell structure 12 and provided with apertures through which the screws 19 extend. The socket 21 is of conventional construction preferably identical to the sockets of the type used in grounded wire light systems of the type commonly employed in vehicles and is adapted to detachably receive an indicating light bulb 23.

The head light system in which the improved indicating device is embodied may include separate light bulbs 24 and 25 having bright and dim filaments 26 and 27 therein respectively, or the bright and dim filaments 26 and 27 may be embodied in a single light bulb if desired. The bright and dim lighting effect may result from long and short range light beam projections respectively from sources of substantially equal light intensity. In the form shown, the bright filament 26 has one terminal grounded and another terminal electrically connected in a circuit comprising a conductor 28 which is connected to a terminal 29 of a switch 30. The dim filament 27 has one terminal grounded and the other terminal electrically connected to a terminal 32 of the switch 30 by a conductor 31. The switch 30 has a middle terminal 30' connected by a conductor 33 with one terminal of a light control switch 34 mounted on the instrument board 35 of the vehicle and the latter switch has another terminal which is electrically connected with the vehicle generator 36 by a conductor 37 which is also electrically connected by a conductor 38 with the car battery 39.

The switch 30 is adapted to connect the terminal 30' and conductor 33 leading from the generator 36 and battery 39 through the main switch 34 with either the circuit of the dim filament 27 or the circuit of the bright filament 26, the switch 30 being of the push button type which alternatively closes the circuits of the bright and dim filaments respectively upon successive operations thereof.

The indicator light bulb 23 has a filament 40 provided with one terminal which is grounded through the casing of the socket 21 and another terminal which is electrically connected by a conductor 41 with the conductor 28 of the bright filament circuit. Thus, when the bright filament circuit is closed by the switch 30, the circuit is also completed through the filament 40 of the indicator bulb 23 to indicate that the bright filaments of the vehicle head lights are operating. If desired, the indicating light bulb 23 may be electrically connected in either the bright or dim filament circuits for disclosing corresponding conditions.

In the form of the invention shown in the drawing, when the bright filaments of the head light system are energized, the indicating bulb 23 emits a light having a color predetermined by the plug 17 rearwardly and in the forward view of the driver of the vehicle. The driver of the vehicle therefore may observe the indicating light to ascertain whether the bright or dim bulbs are energized without distracting his attention from the road or changing his line of vision from a straight forward one. The transparent plug 17 may be so constructed as to diffuse the light and modulate its color intensity so as not to have a blinding or confusing effect upon the driver. While the drawing shows the wiring circuit for a single head light, it is obvious that the filaments of the other head light of the vehicle may be connected in parallel with the filaments 26 and 27.

Although but one specific embodiment of the invention is herein shown and described, it will be understood that various changes in the size, shape and arrangement of parts may be made without departing from the spirit of the invention.

What is claimed is:

A device for producing a predetermined indication including a vehicle radiator shell ornament having an L shaped passage in its rear end portion comprising a passage section extending and opening rearwardly in the forward view of the driver of said vehicle and a communicating passage section opening downwardly said passage being closed at the junction of said passage sections for obstructing forward projection of light therefrom, means on said ornament for attaching the latter to a support, a light unit including a light bulb and socket therefor extending into said downwardly opening passage section for emitting light in the direction of said driver, means for mounting said light unit on said support and centrally of said downwardly opening passage section, and a transparent light emitting closure in the opening of said rearwardly extending passage section for directing light toward said driver, the projection of light from said bulb in all other directions being obstructed by the walls of said passage.

CECIL GAYLORD HALL.